United States Patent Office 3,310,584
Patented Mar. 21, 1967

3,310,584
PREPARATION OF 2,3-DICHLOROTETRAFLUORO-2-CYCLOPENTEN-1-ONE
Robert J. Du Bois and Benjamin Veldhuis, both of Morris Township, Morris County, N.J., assignors to Allied Chemical Corporation, New York, N.Y., a corporation of New York
No Drawing. Filed June 5, 1964, Ser. No. 373,110
6 Claims. (Cl. 260—586)

This invention relates to 2,3-dichlorotetrafluoro-2-cyclopenten-1-one and more particularly to a new and improved process for its preparation.

2,3-dichlorotetrafluoro-2-cyclopenten-1-one having the formula:

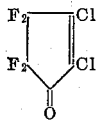

is a known compound and has utility as an intermediate in the preparation of novel insecticidal, miticidal, and herbicidal compounds as disclosed in the copending application of Gilbert and Veldhuis, Ser. No. 373,056 filed of even date. According to the prior art it may be prepared by hydrolysis of the corresponding dimethyl ketal. Unfortunately, however, this procedure is inefficient, time consuming, and uneconomical.

An object of the present invention is to provide a new and improved process for the preparation of 2,3-dichlorotetrafluoro-2-cyclopenten-1-one. Other objects and advantages will be apparent from the following detailed description.

In accordance with the present invention, 2,3-dichlorotetrafluoro-2-cyclopenten-1-one may be prepared in an efficient and economical manner by a process which comprises reacting in admixture 1,2-dichlorohexafluorocyclopentene having the formula:

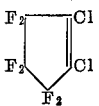

with sulfur trioxide in the presence of a pentavalent antimony compound catalyst and maintaining the admixture for a sufficient length of time to form 2,3-dichlorotetrafluoro-2-cyclopenten-1-one in the reaction medium.

We found that when sulfur trioxide was admixed with 1,2-dichlorohexafluorocyclopentene, no noticeable reaction took place even on extended periods of heating. We tried many compounds including antimony metal and trivalent antimony compounds to effect reaction of sulfur trioxide and 1,2-dichlorohexafluorocyclopentene but without success. Examples of some of the materials tried include: Sb, $SbCl_3$, $SbI_3$, $SiCl_4$, $(CH_3O)_2SiCl_2$, $(CH_3)_4Si$, $SnO_2$, $MoO_3$, Fe, $FeCl_3$, ferric ammonium citrate, $AlCl_3$, $V_2O_5$, $PbCl_2$, $HgCl_2$, $ZnCl_2$, $CuCl_2$, $NiCO_3$, $WO_3$, $MnO_2$, $As_2O_3$, $BiCl_3$, and $CrO_3$. In the course of our work we found that one group of compounds, namely, pentivalent antimony compounds behaved in an unexepected and surprising manner in that these antimony pentavalent compounds acted as powerful catalysts for the reaction. It should be noted that antimony and trivalent antimony compounds were ineffective.

In carrying out the process of the present invention 1,2-dichlorohexafluorocyclopentene is admixed with sulfur trioxide in a reaction vessel which may if desired be equipped with stirring or agitating means. To the admixture is added an effective amount of pentavalent antimony compound desirably with agitation in order to provide a thorough mixing of components. Alternatively, however, the pentavalent antimony compound may if desired be predissolved in a portion of the sulfur trioxide and thereafter the mixture added to a mixture of 1,2-dichlorohexafluorocyclopentene and sulfur trioxide.

Examples of suitable pentavalent antimony catalysts which may be employed in the present invention include antimony pentahalides such as: antimony pentachloride, antimony pentafluoride, antimony pentabromide, and antimony pentaiodide, preferably antimony pentachloride or fluoride. Although the antimony pentavalent catalysts of the present invention tend to induce the reaction in any amount, we prefer to employ an amount ranging from about 0.01 to 10% by weight based on the weight of the sulfur trioxide with optimum results obtainable by employing an amount of catalyst within the range of about 0.1 to 2%.

The temperature of the reaction is not critical and may be varied over a wide range such as from about 0 to 100° C., preferably 20 to 80° C. The operation may be conveniently carried out under atmospheric conditions although super-atmospheric or sub-atmospheric pressure may be employed if desired. Although the reaction may be carried out using stoichiometric quantities of the reactants, it has been discovered that greater efficiency and higher yield of products are obtained when about 4 mols of sulfur trioxide per mol of 1,2-dichlorohexafluorocyclopentene are employed. The employment of molar ratios substantially below about 4 mols of sulfur trioxide per mol of 1,2-dichlorohexafluorocyclopentene results in an increase in the percentage of unreacted 1,2-dichlorohexafluorocyclopentene, whereas an amount of sulfur trioxide in excess of about 6 mols produces no added advantages.

The crude product appears in the reaction medium as an oily liquid and may if desired be separated by adding to the reaction medium a sufficient quantity of solvent such as water in which the impurities but not the product are soluble. Water is particularly desirable as the solvent not only because of its availability but because of the excellent results obtained. After separation of the impurities, the remaining insoluble oily liquid is thereafter subjected to a distillation procedure to recover 2,3-dichlorotetrafluoro-2-cyclopenten-1-one.

The following examples illustrate the invention:

Example I

About 122.5 grams of 1,2-dichlorohexafluorocyclopentene, 160 grams of sulfur trioxide and 0.5 gram of antimony pentachloride (about 0.3% based on the weight of the sulfur trioxide) were admixed in a flask at a temperature of about 32° C. The reaction mixture was heated and refluxed. The pot temperature rose to about 70° C., in 41 minutes. The reaction mixture was then admixed with 200 ml. of water. Approximately 103 grams of water insoluble oil product was recovered which was distilled to give about 44 grams of a product identified as 2,3-dichlorotetrafluoro-2-cyclopenten-1-one.

Example II

About 612.5 grams of 1,2-dichlorohexafluorocyclopentene and 800 grams of sulfur trioxide and 1 gram antimony pentachloride (about 0.13% based on the weight of sulfur trioxide) were admixed in a 250 ml. flask at a pot temperature of about 46° C. The admixture was refluxed to completion in about 3.75 hours, the pot temperature rising during this time to about 66° C. Drowning in water gave 572.5 grams of a crude product which was thereafter subjected to a distillation procedure. A product identified as 2,3 - dichlorotetrafluoro - 2 - cyclopenten-1-one was recovered for about a 35% yield.

The following example illustrates that production of 2,3-dichlorotetrafluoro-2-cyclopenten-1-one does not occur in the absence of a pentavalent antimony catalyst.

*Example III*

122.5 grams of 1,2-dichlorohexafluorocyclopentene was admixed with 160 grams of sulfur trioxide in a 250 ml. flask at a pot temperature of about 46° C. The mixture was refluxed for about 7½ hours. There was no rise in temperature and no reaction occurred over the 7½ hour period.

Although certain preferred embodiments of the invention have been disclosed for purpose of illustration, it will be evident that various changes and modifications may be made therein without departing from the scope and spirit of the invention.

We claim:

1. A process for the preparation of 2,3-dichlorotetrafluoro-2-cyclopenten-1- one which comprises reacting in admixture, 1,2-dichlorohexafluorocyclopentene with sulfur trioxide in the presence of a pentavalent antimony halide catalyst and maintaining the admixture for a sufficient length of time to form 2,3-dichlorotetrafluoro-2-cyclopenten-1-one in the reaction medium.

2. The process of claim 1 wherein the pentavalent antimony halide is present in an amount of from about 0.01 to 10% by weight based on the weight of the sulfur trioxide.

3. The process of claim 1 wherein the pentavalent antimony halide is pentavalent antimony chloride.

4. The process of claim 1 wherein the pentavalent antimony halide is pentavalent antimony fluoride.

5. A process for the preparation of 2,3-dichlorotetrafluoro-2-cyclopenten-1-one which comprises reacting in admixture 1,2-dichlorohexafluorocyclopentene with sulfur trioxide in the presence of a pentavalent antimony chloride catalyst in an amount of from about 0.01 to 10% by weight based on the weight of the sulfur trioxide and maintaining the admixture for a sufficient length of time to form 2,3-dichlorotetrafluoro-2-cyclopenten-1-one in the reaction medium.

6. A process for the preparation of 2,3-dichlorotetrafluoro-2-cyclopenten-1-one which comprises reacting in admixture 1,2-dichlorohexafluorocyclopentene with sulfur trioxide in a molar ratio of about 1 mol of 1,2-dichlorohexafluorocyclopentene to 4 mols of sulfur trioxide in the presence of a pentavalent antimony chloride catalyst in an amount of about 0.01 to 5% by weight based on the weight of the sulfur trioxide and maintaining the admixture for a sufficient length of time to form 2,3-dichlorotetrafluoro-2-cyclopenten-1-one, treating the reaction medium with water to separate impurities therefrom and thereafter recovering 2,3 - dichlorotetrafluoro-2-cyclopenten-1-one from the reaction medium.

References Cited by the Examiner
UNITED STATES PATENTS

Newcomer et al.: "J. Am. Chem. Soc.," vol. 71, pp. 949 and 950 (1949).

LEON ZITVER, *Primary Examiner.*

M. M. JACOB, *Assistant Examiner.*